March 16, 1926.  1,577,252
J. G. EENIGENBURG
HARVESTER FOR ONION SETS OR THE LIKE
Filed Jan. 30, 1925  3 Sheets-Sheet 1

March 16, 1926. 1,577,252
J. G. EENIGENBURG
HARVESTER FOR ONION SETS OR THE LIKE
Filed Jan. 30, 1925  3 Sheets-Sheet 2

Inventor
John G. Eenigenburg
By
Attorneys.

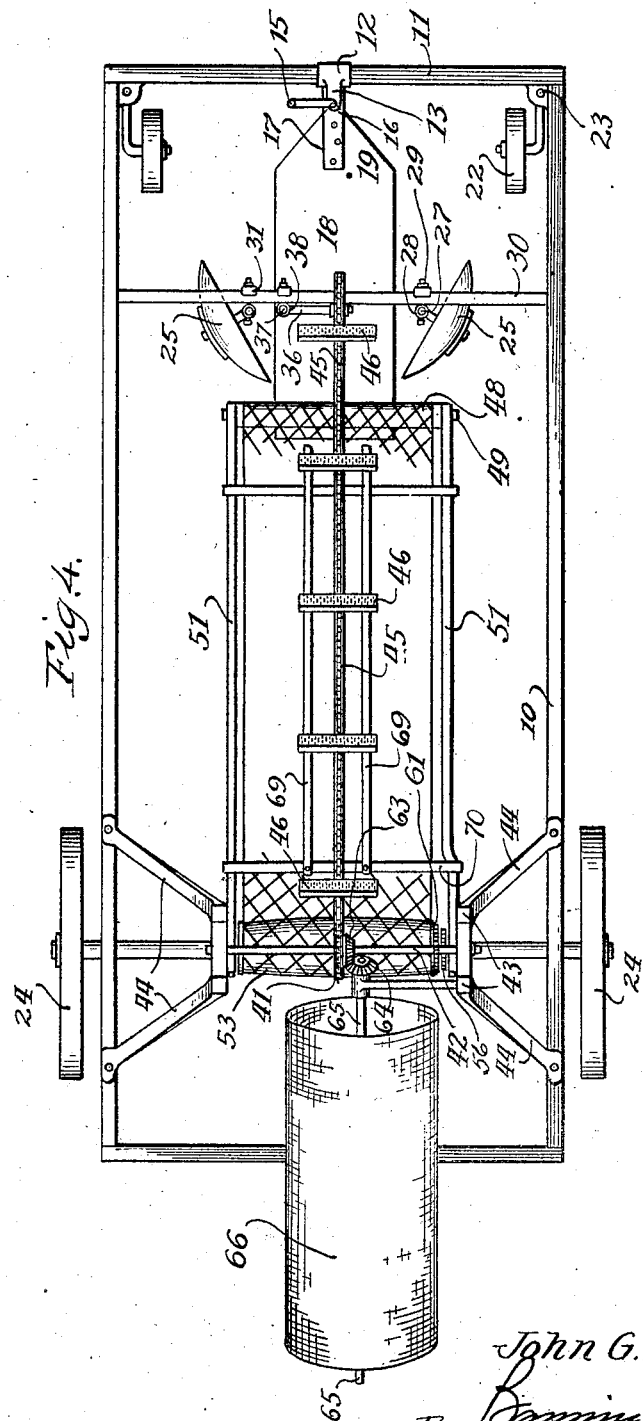

Patented Mar. 16, 1926.

1,577,252

UNITED STATES PATENT OFFICE.

JOHN G. EENIGENBURG, OF LANSING, ILLINOIS.

HARVESTER FOR ONION SETS OR THE LIKE.

Application filed January 30, 1925. Serial No. 5,694.

*To all whom it may concern:*

Be it known that I, JOHN G. EENIGENBURG, a citizen of the United States, residing at Lansing, in the county of Cook and State of Illinois, have invented certain new and useful Improvements in Harvesters for Onion Sets or the like, of which the following is a specification.

In the growing of onions it is customary to plant the onion seeds in spaced rows very closely seeded, so that in the early stages of growth the young sprouts will come up in such close proximity to one another as to retard their growth after a certain stage of development has been reached. In these circumstances, it becomes necessary at the proper time to harvest the onion sprouts and clean them from adhering earth and afterwards reset them in proper spaced relation to permit of the further growth and maturity of the plants.

This method of propagation permits great numbers of sprouts to be grown upon a comparatively restricted area and afterwards harvested and shipped to localities where the sprouts are reset at proper time and grown to maturity. One great advantage in this method lies in the fact that the onion sets may be grown as a fall crop, harvested and shipped in the winter and reset in the early spring, which greatly advances the time of maturity as compared with seed planted in the spring.

The harvester of the present invention is designed primarily for the purpose of harvesting, cleaning and discharging the onion sets, although, obviously it might be employed in connection with the harvesting of other crops of a generally similar nature.

In the drawings:

Fig. 3 is a detail showing the gearing for the sifter drum and shafting, and Fig. 4 is a plan view of the entire machine with the mesh conveyor partly removed for purposes of clarity.

Figure 1:
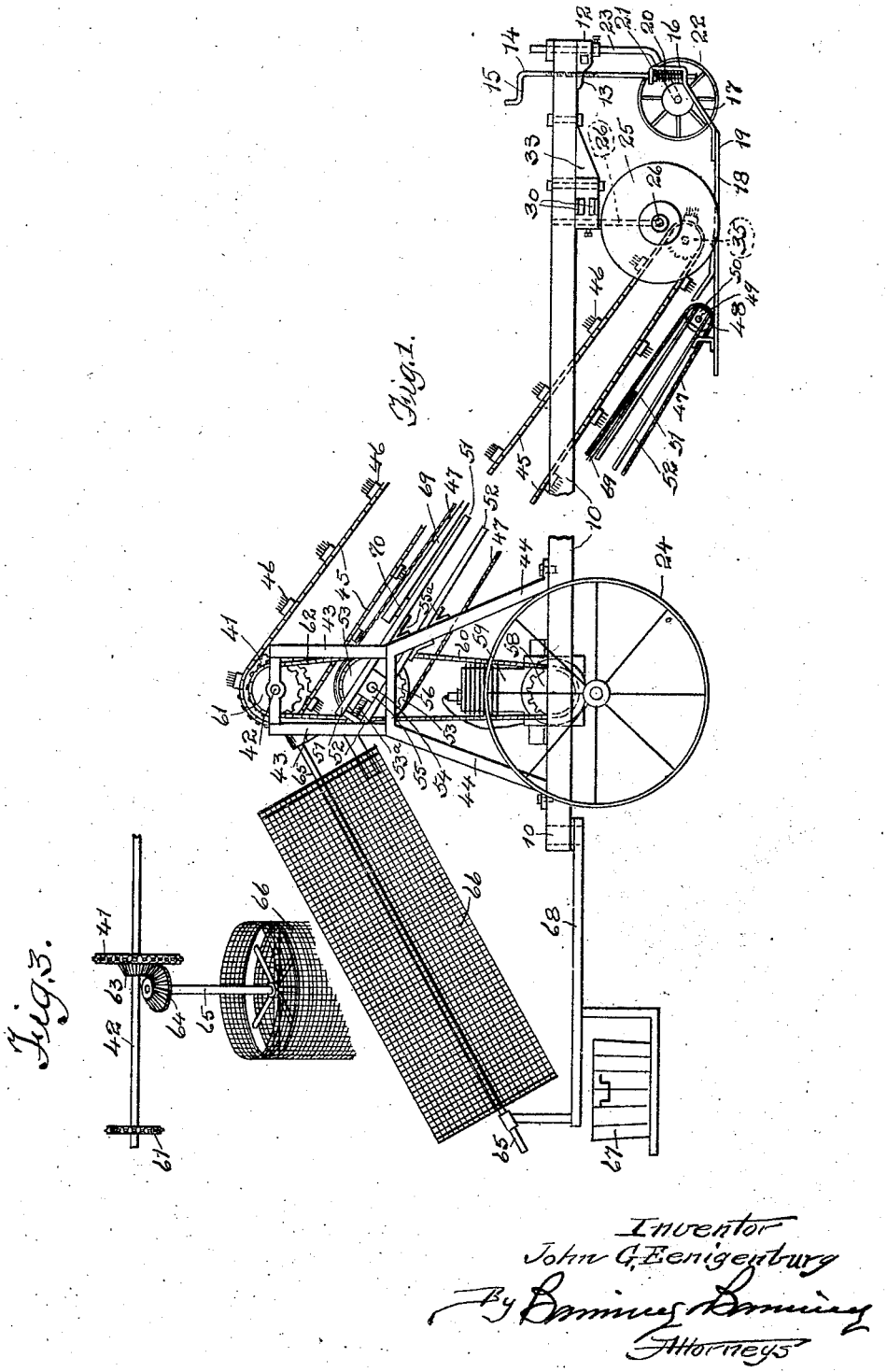
Figure 1 is a side elevation of the harvester as a whole.

The harvester as a whole is built upon or supported by a pair of side rails 10 connected by a front cross rail 11 provided in the center with a casting 12 having a rearwardly extending tongue 13 which receives a vertical adjusting screw 14 provided at its end with a handle 15. The lower end of the adjusting screw 14 is entered through the vertically disposed bracket 16 terminating in a foot plate 17 which is riveted or otherwise secured to a ground plate 18 which is tapered at its forward end 19. A coil spring 20 surrounds the lower end of the adjusting screw which preferably extends freely through the bracket 16, and a collar 21 on the screw shank bears directly against the spring, so that by rotating the adjusting screw spindle, spring pressure may be exerted upon the forward end of the ground plate to hold the same in firm contact with the surface of the ground.

The frame of the machine is supported upon a pair of forward caster wheels 22 at the forward outer corners of the frame, which caster wheels are mounted at the lower ends of caster spindles 23 in the usual manner. The rear ends of the frame are supported upon ground wheels 24.

The ground plate 18 co-operates with a pair of inwardly facing deeply dished disks 25 which are mounted respectively upon the outturned ends 26 of a pair of vertically disposed standards 27, the upper end of each standard being entered through a collar 28 which is formed on the end of a bolt 29. The bolts 29 are entered between a pair of transversely extending bridge bars 30, and the forward ends of the bolts are entered through clips 31 which serve to embrace and hold the bridge bars in closely spaced relation, nuts 32 being provided on the ends of the bolts, which nuts bear against the clips 31 and serve to clamp the structure tightly together. The ends of the bridge bars 30 are entered through bracket castings 33 which are bolted beneath the side rails. Set screws 34 are entered through the collars 28 to hold the standards 27 in vertically adjustable position.

Figure 2:
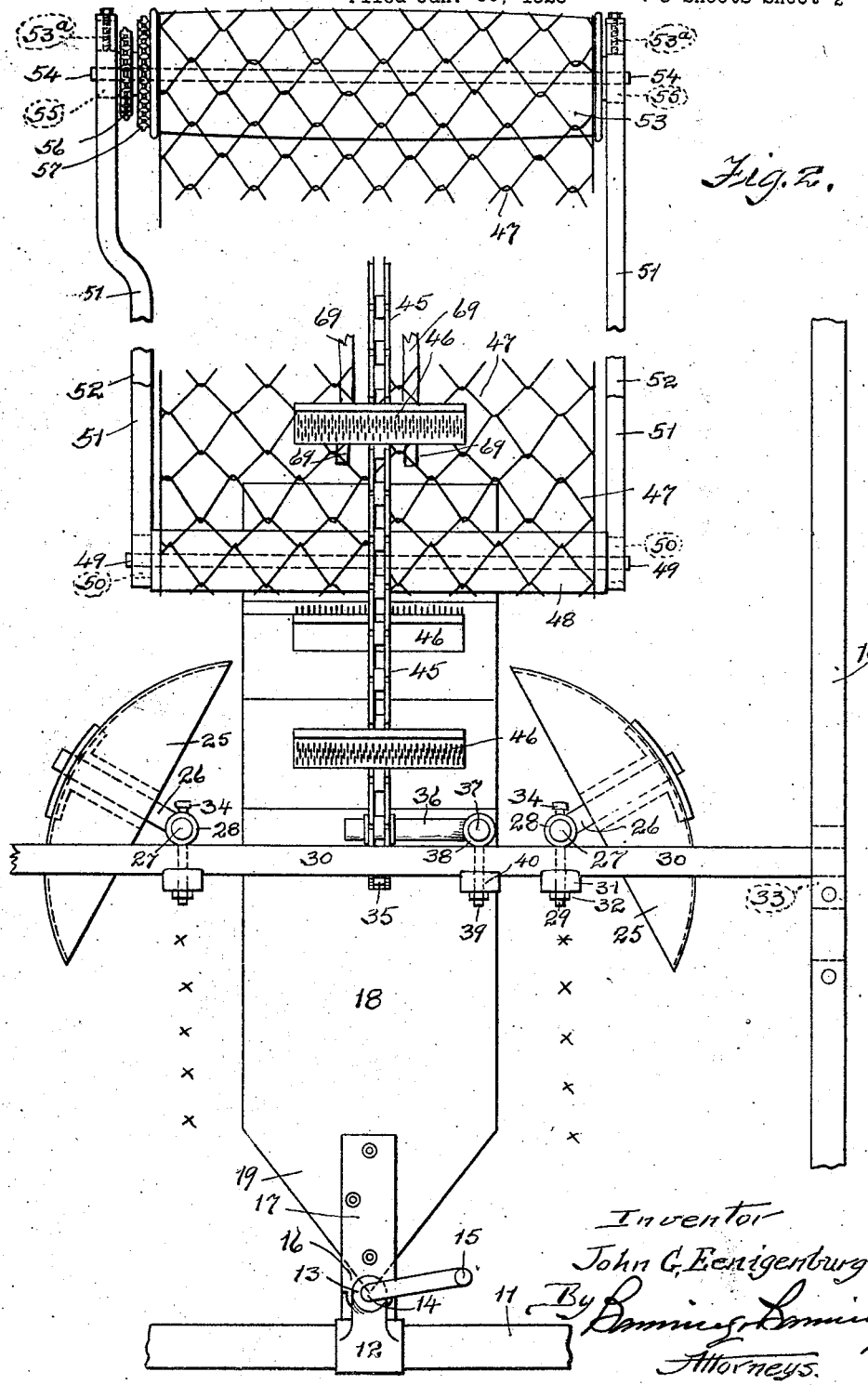
Fig. 2 is an enlarged plan view of the forward end of the machine, with an intermediate portion broken away and the upper brush-chain sprocket and shaft removed.

As indicated in Fig. 2, the companion disks are set to have their lower or acting edges in converging relation to one another, and when in actual use, the lower edges of the disks will be set to dig slightly into the surface of the ground at points laterally adjacent the ground plate 18, so that as the machine advances, furrows will be turned over onto the ground plate which has the effect of uprooting the onion sprouts to deliver them, together with the adjacent earth upon the surface of the plate. The positions occupied by adjacent rows of sprouts is indicated by lines x x x x in Fig. 2.

Immediately below the center of the bridge bars 30 is located a sprocket wheel 35 which is mounted upon the inturned end 36 of a standard 37, the upper end of which is entered through a collar 38 on the end of a bolt 39 entered through a clip 40 similar in construction and arrangement to the clip 31, previously described. The forward sprocket wheel 35 co-operates with a rear sprocket wheel 41 carried by a shaft 42 journaled between a pair of elevated upper side frames 43, which frames are mounted upon and extend above a pair of lower side frames 44 which in turn are supported upon the side rails 10.

The sprocket wheels 41 and 35 serve to mount an endless chain 45 which carries a plurality of transversely extending spaced brushes 46, the arrangement being such that the brushes, in passing around the lower forward sprocket wheel 35, will pass in close proximity to the upper surface of the ground plate 18 with the result that the ridge of earth which is heaped inwardly toward the center of the ground plate by the action of the disks will be agitated by the passage of the brushes and swept backwardly and upwardly toward an endless mesh conveyor 47, preferably formed of interwoven mesh wire fabric similar in character to or identical with chicken wire, as indicated in Fig. 2. The forward end of the endless mesh conveyor passes around a forward drum 48 provided with trunnions 49 entered through journal blocks 50, which blocks are located between upper and lower obliquely disposed substantially parallel conveyor frame rails 51 and 52, the journal blocks serving as spacers for the forward ends of the guide rails.

The upper turn of the mesh conveyor passes over an upper driving drum 53 which is preferably of barrel shape being outwardly bulged or notched towards its center for the purpose of counteracting the natural tendency of the mesh conveyor to sag in the center, and the upper drum is mounted upon a shaft 54 which is journaled within adjustable journal blocks 55 carried between the conveyor frame rails 51 and 52, which journal blocks are adapted to be adjusted by means of screws 53ª to afford a slight degree of adjustment in tensioning the conveyor.

The upper ends of the conveyor frame rails are secured in any suitable manner to the upstanding frame 44, as, for instance, by the provision of brackets 55ª or the like. The upper drum shaft 54 is provided with outer and inner sprocket wheels 56 and 57, respectively as indicated at the upper left of Fig. 2, the former of which receives power from a sprocket wheel 58 carried on the shaft of a gas engine 59 through the medium of a sprocket chain 60 which serves to drive the conveyor belt. The sprocket wheel 57 co-operates with a sprocket wheel 61 on the shaft 42 through the medium of a chain 62, thus serving to drive the chain 45 which carries the brushes 46.

The shaft 42 carries a bevel pinion 63 which meshes with a bevel pinion 64 on an obliquely disposed sifter shaft 65, which carries a mesh sifter drum 66 open at its upper and lower ends and adapted to discharge at its lower end into a tub or other receptacle 67 carried by a rear extension 68 secured to the main frame.

In order to additionally support the center of the mesh conveyor 47 against sagging, one or more obliquely disposed center bars 69 are provided below the mesh conveyor, the lower forward ends of which bars rest upon and are secured to the conveyor from rails 51, and the rear ends of which rest upon and are supported by a cross plate 70, the ends of which are supported upon the upper conveyor rail 51, or in any other suitable manner.

In use the machine is dragged along the ground with the ground plate occupying the space between two adjacent rows of onion sets or similar small shoots, and with the ground plate adjusted by the handle 15 to bear firmly upon the surface of the ground. The co-operating inthrowing disks are adjusted to cut into the ground to the desired depth and as the machine advances, the young sprouts, together with the surrounding earth will be thrown inwardly and heaped upon the ground plate where they will be subjected to the brushing action of the brushes 46 which not only tend to loosen up, disintegrate and sweep back the soil, but also serve to feed the sprouts rearwardly upon the mesh conveyor which carries them upwardly and allows adhering soil to fall away and be discharged, and this continues until the upper limit of the conveyor is reached at which point the shoots, together with such small amount of soil as may still adhere to them, are discharged into the rotating sifter which serves to agitate the shoots and finally clean them before they are discharged into the tub or receptacle.

The invention is one which serves greatly to simplify the harvesting of onion sets or like shoots and enables the sets to be collected in a clean condition and ready for storage or shipment. Although the invention, as shown, discloses the use of a gasoline engine for imparting power to the conveyor and brush chain, it is obvious that such power might be derived from the ground wheels under favorable ground conditions, and that various modifications may be made in the structure and arrangement of the frame work which supports the operating mechanisms without departing from the spirit of the invention.

I claim:

1. In a harvester of the class described, the combination of a frame, a ground plate secured to the frame, means for upturning ground and included sprouts upon the ground plate, a movable conveyor for carrying the sprouts rearwardly from the ground plate, means overlying the conveyor and co-operating therewith for disintegrating and separating the soil from the sprouts, and a rotating sifter drum at the discharge end of the conveyor into which the sprouts are discharged, substantially as described.

2. In a harvester of the class described, the combination of a frame, a ground plate secured to the frame, means for upturning ground and included sprouts upon the ground plate, a mesh conveyor for carrying the sprouts rearwardly from the ground plate, and brushes mounted to move in proximity to the conveyor to sweep the sprouts onto the conveyor, and co-acting therewith in disintegrating and separating the soil from the sprouts and a rotating sifter drum at the discharge end of the conveyor into which the sprouts are discharged from the conveyor, substantially as described.

3. In a harvester of the class described, the combination of a frame, a ground plate carried by the frame, a disk mounted adjacent to the ground plate and adapted to upturn the soil and included sprouts and throw the same onto the ground plate, an inclined endless chain conveyor mounted in position to receive the sprouts from the ground plate, means for sweeping the sprouts from the ground plate onto the conveyor, and mechanisms for imparting operative movements to said conveyor and said sweeping means, and a downwardly and rearwardly inclined open ended sifting drum located adjacent to the discharge end of the conveyor in position to receive the sprouts, and means for rotating said sifting drum, substantially as described.

4. In a harvester of the class described, the combination of a frame, a flat ground plate secured to the frame, a pair of rearwardly converging disks mounted one on each side of the ground plate and adapted to upturn the soil and included sprouts and deposit the same upon the ground plate, an endless mesh conveyor mounted in rearwardly inclined relation to the ground plate, and an endless member carrying brushes mounted above the mesh conveyor in position to sweep the shoots onto the conveyor, and means for operating the conveyor and the endless brush carrying member, substantially as described.

5. In a harvester of the class described, the combination of a frame, a flat ground plate secured to the frame, a pair of rearwardly converging disks mounted one on each side of the ground plate and adapted to upturn the soil and included sprouts and deposit the same upon the ground plate, an endless mesh conveyor mounted in rearwardly inclined relation to the ground plate, and an endless member carrying brushes mounted above the mesh conveyor in position to sweep the shoots onto the conveyor, means for operating the conveyor and the endless brush carrying member, and an obliquely disposed open ended sifting drum mounted at the discharge end of the conveyor and adapted to receive the shoots therefrom, and means for rotating said sifting drum, substantially as described.

6. In a harvester of the class described, the combination of a frame, a flat ground plate secured to the frame, a pair of rearwardly converging inthrow disks one on each side of the ground plate and adapted to deposit soil and included sprouts onto the ground plate, a rearwardly upwardly extending endless mesh conveyor having its lower end in proximate relation to the surface of the ground plate, forward and rear drums around which said conveyor is carried, an endless brush carrier mounted above and in parallel relation to the mesh conveyor and provided with brushes adapted to sweep the sprouts upwardly onto the conveyor, means for imparting rotation to said endless brush carrier, and means for imparting rotation to one of the conveyor drums, substantially as described.

7. In a harvester of the class described, the combination of a frame, a flat ground plate secured to the frame, a pair of rearwardly converging inthrow disks one on each side of the ground plate and adapted to deposit soil and included sprouts onto the ground plate, a rearwardly upwardly extending endless mesh conveyor having its lower end in proximate relation to the surface of the ground plate, forward and rear drums around which said conveyor is carried, an endless brush carrier mounted above and in parallel relation to the mesh conveyor and provided with brushes adapted to sweep the sprouts upwardly onto the conveyor, means for imparting rotation to said endless brush carrier, an open ended sifting drum extending obliquely downwardly from the upper end of the mesh conveyor and adapted to receive sprouts discharged from the conveyor, and means for imparting rotation to said sifting drum, substantially as described.

JOHN G. EENIGENBURG.